United States Patent [19]

Fujimoto et al.

[11] Patent Number: 4,725,648
[45] Date of Patent: Feb. 16, 1988

[54] POLYORGANOSILOXANE COMPOSITION

[75] Inventors: Tetsuo Fujimoto; Hideaki Takaoka; Takafumi Imai, all of Ohta, Japan

[73] Assignee: Toshiba Silicone Co., Ltd., Japan

[21] Appl. No.: 916,339

[22] Filed: Oct. 7, 1986

[30] Foreign Application Priority Data

Oct. 15, 1985 [JP] Japan ................................. 60-227755
Oct. 15, 1985 [JP] Japan ................................. 60-227756

[51] Int. Cl.$^4$ ................................................ C08F 8/00
[52] U.S. Cl. .................................... 525/100; 525/101; 528/15; 528/31; 528/32; 528/17; 528/18; 528/26
[58] Field of Search .................. 525/100, 101; 528/15, 528/31, 32, 26, 18, 17

[56] References Cited

U.S. PATENT DOCUMENTS 4,320,172 3/1982 Takamizawa et al. .............. 525/100
4,348,454 9/1982 Eckberg ............................... 525/100

Primary Examiner—Melvyn I. Marquis
Attorney, Agent, or Firm—John W. Harbour

[57] ABSTRACT

The present invention relates to a polyorganosiloxane composition and, more particularly, to a polyorganosiloxane composition having good curing properties at room temperature and producing cured materials having good water absorption properties. The polyorganosiloxane composition comprises:

(A) a curable silicone rubber composition containing polysiloxane which is liquid at room temperature as a base polymer; and
(B) a polymer containing acrylic acid or an alkali metal salt of acrylic acid as a monomer unit.

12 Claims, No Drawings

POLYORGANOSILOXANE COMPOSITION

The present application claims priority of Japanese Patent Applications serial No. 60-227755 and No. 60-227756 both filed on Oct. 15, 1985.

BACKGROUND OF THE INVENTION

The present invention relates to a polyorganosiloxane composition. More particularly, the present invention relates to a polyorganosiloxane composition having good curing properties at room temperature and producing cured materials having good water absorption properties.

Silicone rubbers generally have a hydrophobic nature and therefor display excellent water repellency. As a method of providing a hydrophilic nature for silicone rubbers, it is known to use a polyorganosiloxane which is modified by polyoxyalkylene as a base polymer or as an additive.

However, such a method can provide a certain extent of hydrophilic nature to a silicone rubber but cannot provide it with water absorbing properties. Additionally, this method is disadvantageous in that it degenerates the mechanical properties of silicone rubbers. Furthermore, in preparing the polyoxyalkylene-modified polyorganosiloxane used in this method, a step of copolymerizing the polyoxyalkylene compound with the polyorganosiloxane is complicated and time consuming.

Many rubber compounds are also known which contain a (co)polymer of acrylic acid or a metal salt of acrylic acid as a filter in order to provide water absorption properties to the rubber materials. Such use of a (co)polymer of acrylic acid or a metal salt of acrylic acid presents a problem in that when it is filled in an oily or hydrophobic rubber material, the surface of the filler is coated with the hydrophobic rubber material and loses the water absorption properties.

SUMMARY OF THE INVENTION

Accordingly, it is an object of the present invention to eliminate the above-described problems in the prior art and to provide a polyorganosiloxane composition having good curing properties at room temperature and producing cured materials having good water absorption properties.

As a result of the present inventors' researches, it has been found that if a silicone rubber composition is selected from among hydrophobic materials in general and a (co)polymer of acrylic acid or an alkali metal salt of acrylic acid is used as a filler therefor, it is possible to obtain a composition which does not lose the water absorption properties or, rather, has a degree of water absorbing capability which is unexpected in silicone rubber. The present invention has been achieved on the basis of this finding and will become clearer from the following description.

DETAILED DESCRIPTION OF THE INVENTION

According to the present invention, there is provided a polyorganosiloxane composition comprising (A) a curable silicone rubber composition having polysiloxane which is liquid at room temperature as a base polymer, and (B) a polymer containing acrylic acid or an alkali metal salt of acrylic acid as a monomer unit.

The curable silicone rubber composition of the component (A) may be of an addition cured type or a condensation cured type.

When an addition cured type silicone rubber composition is used, a polyorganosiloxane composition of the present invention preferably has the following components:

(C) 100 parts by weight of polyorganosiloxane having at least two units in a molecule represented by the following formula:

wherein $R^1$ represents an alkenyl group, $R^2$ a substituted or unsubstituted monovalent hydrocarbon group which contains no aliphatic unsaturated bond, a is an integer of 1 or 2, b is an integer between 0 and 2 inclusive, and $a+b$ is an integer between 1 and 3 inclusive;

(D) polyorganohydrogensiloxane in quantities in which the number of hydrogen atoms which are combined with a silicon atom is 0.5 to 4.0 per $R^1$ group in polyorganosiloxane (C), and the molecules on average comprising at least three units represented by the formula:

wherein $R^3$ represents a substituted or unsubstituted monovalent hydrocarbon group, c is an integer between 0 and 2 inclusive, d is an integer of 1 or 2, and $c+d$ is an integer between 1 and 3 inclusive;

(E) 1 to 100 ppm platinum or platinum compound catalyst, as platinum with respect to polyorganosiloxane (C); and (B) 0.5 to 200 parts by weight of a polymer containing acrylic acid or an alkali metal salt of acrylic acid as a monomer unit.

Polyorganosiloxane (C) which is used in the present invention has at least two alkenyl groups per molecule which are combined with a silicon atom. Such polyorganosiloxane (C) may be either a straight-chain or branched molecule and a mixture of both molecule may also be used.

As examples of $R^1$ in the formula in (C), a vinyl group, an allyl group, a 1-butenyl group, and a 1-hexenyl group may be cited, the vinyl group being most favorable because it is easy to synthesize. As examples of $R^2$ and other organic groups which are combined with a silicon atom in a siloxane unit, there may be mentioned alkyl groups such as a methyl group, ethyl group, propyl group, butyl group, hexyl group and dodecyl group; aryl groups such as a phenyl group; aralkyl groups such as $\beta$- phenylethyl group and $\beta$-phenyl propyl group; and substituted hydrocarbon groups such as a chloromethyl group and a 3,3,3 - trifluoropropyl group. Among these, a methyl group is the most preferably because this polyorganosiloxane is easy to synthesize, has a degree of polymerization which is necessary for maintaining good physical properties after curing, and low viscosity before curing. The viscosity of component (C) at 25° C. is preferably in the range of 100 to 500,000 cSt because under this condition the component (C) has appropriate flow before curing and displays excellent physical properties after curing.

Polyorganohydrogensiloxane (D) has at least three hydrogen atoms per molecule which are combined with a silicon atom in order to reticulate the composition by crosslinking. $R^3$ in the formula in (D) may be any of the usual organic groups which are combined with a silicon atom in a siloxane unit, for example, the groups cited above for $R^2$, but a methyl group is the most preferable from the stand opint of ease of synthesis. The polyorganohydrogensiloxane (D) may be straight-chain, branched, cyclic, or a mixture of these molecules.

As the component (D), a compound represented by one of the following formulae (a) to (c) or a mixture of these compounds are preferable in that these compounds provide good physical properties for a composition after curing.

(a) Branched polyorganohydrogensiloxane comprising units of $(CH_3)_2HSiO_{\frac{1}{2}}$ and $SiO_2$ and containing 0.3 to 1.2% by weight of hydrogen atoms which are combined with a silicon atom.

(b) Straight-chain polyorganohydrogensiloxane represented by the following formula and containing 0.5 to 1.6% by weight of hydrogen atoms which are combined with a silicon atom:

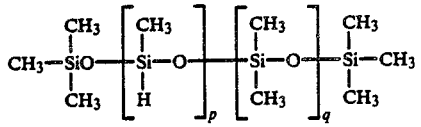

wherein p represents an integer between 3 and 100 inclusive, and q an integer between 0 and 100 inclusive.

(c) Straight-chain polyorganohydrogensiloxane represented by the following formula and containing 0.5 to 1.6% by weight of hydrogen atoms which are combined with a silicon atom:

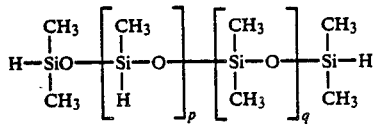

wherein p represents an integer between 1 and 100 inclusive, and q an integer between 0 and 100 inclusive.

The amount of the component (D) is determined so as to satisfy the condition that the number of hydrogen atoms which are combined with a silicon atom in the component (D) is 0.5 to 4.0, preferably 1.0 to 3.0 per an alkenyl group in the component (C). If the number of hydrogen atom is less than 0.5, the curing of the composition does not proceed adequately, and the degree of hardness after curing is lowered. On the other hand, if the number of hydrogen atoms exceeds 4.0, the physical properties of the composition after curing become poor.

A platinum catalyst, component (E), is used in order to accelerate the addition cure between an alkenyl group of component (C) and a hydrosilyl group in component (D). Examples of suitable platinum catalysts include, atomic platinum, chloroplatinic acid, platinum-olefin complexes, platinum-alcohol complexes, and a platinum coordination compounds. The amount of the component (E) to be used is 1 to 100 ppm in terms of the amount of platinum with respect to the component (C). If it is less than 1 ppm, the effect of the present invention is not achieved, while if the use of component (E) exceeds 100 ppm, no enhancement in cure speed is expected.

As a polymer containing acrylic acid or an alkali metal salt of acrylic acid as a monomer unit, (B), of the present invention, an acrylic acid-vinyl alcohol copolymer, a sodium acrylate polymer and an sodium acrylate-acrylamide copolymer are exemplified. More concretely, such polymers are commercially available as Sumicagel SP-520 or Sumicagel NP-1020 (trade name : produced by Sumitomo Chemical Co., Ltd.), and Aquakeep 4S or Aquakeep 10SH (trade name : produced by Seitetsu Kagaku Co., Ltd.).

The component (B) may be in spherical, powdery, granular, or fibrous form, but in order to enable a cured composition to display adequate water absorption properties and in order to provide it with adequate mechanical strength, the component (B) is preferably powdery.

If a powdery is used as the component (B), the mean particle diameter is preferably 0.1 to 200 μm. If mean particle diameter is less than 0.1 μm, the powdery polymer is not likely to disperse uniformly in the composition. On the other hand, if it exceeds 200 μm, the properties of the powdery polymer as a foreign matter are enhanced, and the mechanical properties, in particular, the rubber elasticity of the cured composition may be lowered.

The amount of the component (B) to be added is 0.5 to 200 parts by weight, preferably 5 to 100 parts by weight with respect to 100 parts by weight of polyorganosiloxane (C). If it is less than 0.5 parts by weight a pronounced water absorbing effect is not obtained, while the use of the component (B) in amount exceeding 200 parts by weight makes uniform dispersion difficult, lowers the rubber elasticity and deteriorates the mechanical properties.

If the curable silicone rubber composition, (A), is of a condensation cured type, a polyorganosiloxane composition of the present invention has preferably the following components:

(F) 100 parts by weight of silanol end blocked polyorganosiloxane having a viscosity of 500 to 500,000 cSt at 25° C.;

(B) 0.5 to 200 parts by weight of a polymer containing acrylic acid or an alkali metal salt of acrylic acid as a monomer unit; and (G) a curing agent.

The Polyorganosiloxane of the (F) component used in the present invention is a silanol end blocked straight-chain polymer which may contain branched chains.

The organic groups which are combined with a silicon atom in the diorganosiloxane of the component (F), may be either the same or different and may be selected from any of the groups usually used in silicone polymers. For example, the same groups as those represented by $R^1$ or $R^2$ in the component (C) may be cited as suitable.

Among these groups, a methyl group, a vinyl group and a phenyl group are preferred in that they are easy to synthesize. A methyl group is the most preferable for several reasons. If a methyl group is used as the organic group, the synthesis of an intermediate material is easier in comparison with a case of using other organic groups. Further, the viscosity of component (F) is lower than with any other groups, particularly where there is a high degree of polymerization. Finally, the methyl groups have a good influence on the balance of the physical properties of the cured elastomer. Thus, a methyl group is the most preferred, but when it is required for a cured composition to have heat resistance, some of the organic groups which are combined with a silicon atom are preferably phenyl groups. Even when organic groups other than a methyl group are contained, it is preferred that at least 85% in number of all the organic groups in the polymer be methyl groups for the above-described reasons.

The viscosity at 25° C. of such polyorganosiloxane is 500 to 500,000 cSt and preferably 1,000 to 200,000 cSt. If the viscosity is less than 500 cSt, it is difficult for the polyorganosiloxane to provide excellent mechanical properties to the cured composition. On the other hand, if it exceeds 500,000 cSt, it is difficult to impart the appropriate flow to the uncured composition.

The kinds and the amount of the component (B) in a polyorganosiloxane composition of this case are the same as the foregoing.

In order to maintain the storage stability of the composition in the case of condensation cured type silicone rubber, it is desirable that component (B) is dried in vacuum at a temperature below 100° C. before incorporation, or the water contained in the component (B) is removed by kneading the comopsition under reduced pressure at a temperature below 100° C.

The component (G) of the composition of the present invention is a component for crosslinking and curing the component (F). As the component (G), it is possible to use an organic silicon compound having at least three hydrolyzable groups per molecule which are combined with a silicon atom.

The organic silicon compound may be exemplified by either a silane or a polysiloxane.

Suitable hydrolyzable groups which may be combined with a silicon atom in an organic silicon compound, are, for example, alkoxy groups, acyloxy groups, N,N-dialkylamino groups, N-alkylamide groups, N,N-dialkylaminoxy groups, ketoxime groups and alkenoxy groups.

In the organic silicon compound of component (G), other organic groups than the above-described hydrolyzable groups may be combined with a silicon atom; for example, an alkyl group such as a methyl group, ethyl group, propyl group and butyl group; an alkenyl group such as a vinyl group and an allyl group; an aryl group such as a phenyl group; and a haloalkyl group such as 3,3,3-trifluoropropyl group and a chloromethyl group may be used. In such an organic silicon compound, it is preferable that the hydrolyzable group which is combined with a silicon atom is added to the extent of at least the equivalent of the silanol group in component (F).

If an organic silicon compound is insufficient to progress curing, a small amount of cure accelerator may be employed. Suitable cure accelerators are, for example, a metal salt of an organic carboxylic acid such as dibutyl tin diacetate, dibutyl tin dioctoate, dibutyl tin dilaurate, cobalt naphthenate, tin octoate, iron octoate, and manganese octoate; a metal alcoholate such as tetrabutyl titanate and tetrabutyl zirconate; and an organic tin compound such as dibutyl tin oxide and dibutyl tin dimethoxide.

Whether a curable silicone rubber composition in the component (A) is of an addition cured type or a condensation cured type, other ingredients as well as the aforementioned may be added thereto and mixed therewith, if necessary. For example, a filler such as diatomaceous earth, calcium carbonate, ground quartz and fumed silica; and a pigment such as red oxide, titanium dioxide, zinc white and ultramarine blue may be used. Furthermore, as desired other polyorganosiloxanes may also be used together with the above-described polyorganosiloxane so long as the effects of the present invention are not impaired.

As described above, according to the present invention, it is possible to provide excellent water absorption properties for the cured composition by adding a polymer which contains acrylic acid or an alkali metal salt of acrylic acid as a monomer unit to the composition. If a cured composition which has once absorbed water is left at a temperature between room temperature and 100° C., it gradually release water and is restored to the state before water absorption, and the physical properties such as hardness and tensile stregth change very little.

When a conventional silicone rubber is used for a mold, much labor is required for molding due to the water repellency, but the use of the composition of the present invention for a mold enables gypsum or ceramic which contain a large amount of water to be reproduced very quickly due to water absorption of the mold itself. When a composition of the present invention is applied to a silicone rubber sealant for preventing water leakage, the water absorbing properties of the sealant increases that effect. In addition, when a composition of the present invention is applied to a coating agent, the water absorbing properties and the hygroscopicity enhance the stain resistance and the fungus resistance. Thus, a composition of the present invention can provide conventional silicone rubbers with novel properties as described above.

EXAMPLES OF THE INVENTION

The present invention will be explained in more detail hereinunder with reference to examples and comparative examples, but is not limited to the examples. In the examples, "Part(s)" means part(s) by weight.

EXAMPLE 1

100 parts of polydimethylsiloxane base oil having both ends sealed by dimethylvinylsilyl groups and having the viscosity of 3,000 cSt at 25° C., 15 parts of Aquakeep 10SH (trade name: produced by Seitetsu kagaku Co, Ltd.) as a sodium acrylate polymer, 2 parts of straight-chain polymethylhydrogensiloxane having both ends sealed by trimethylsilyl group, containing 0.8% by weight of silicon bonded hydrogen and having the viscosity of 20 cSt at 25° C., and 30 ppm (in terms of platinum with respect to the base oil) of isopropyl alcohol solution of chloroplatinic acid were mixed and uniformly dispersed, thereby obtaining a composition of the present invention.

EXAMPLE 2

100 parts of polydimethylsiloxane base oil having both ends sealed by dimethylvinylsilyl groups and having the viscosity of 10,000 cSt at 25° C, 10 parts of Aerosil 200 (trade name: fumed silica produced by Degussa Co. Ltd.), 20 parts of Sumicagel SP-520 (trade name: produced by Sumitomo Chemical Co. Ltd.) as an acrylic acid-vinyl alcohol copolymer, 1.5 parts of polymethylhydrogensiloxane comprising a $(CH_3)_2HSiO_{\frac{1}{2}}$ unit and an $SiO_2$ unit, containing 1.02% by weight of silicon bonded hydrogen atoms, and having the viscosity of 21 cSt at 25° C., and 20 ppm (in terms of platinum with respect to the base oil) of isopropyl alcohol solution of chloroplatinic acid were mixed and uniformly dispersed, thereby obtaining a composition of the present invention.

EXAMPLE 3

100 parts of polydimethylsiloxane base oil having both ends sealed by a dimethylvinylsilyl group and having the viscosity of 10,000 cSt at 25° C., 10 parts of Aerosil 200, 20 parts of Sumicagel SP-520 were mixed and uniformly dispersed, and thereafter the mixture was aged at the temperature of 50° C. for 60 days. 1.5 parts of polymethylhydrogensiloxane comprising a $(CH_3)_2HSiO_{\frac{1}{2}}$ unit and an $SiO_2$ unit, containing 1.02% by weight of silicon bonded hydrogen atoms and having the viscosity of 21 cSt at 25° C., and 20 ppm (in terms of platinum with respect to the base oil) of isopropyl alcohol solution of chloroplatinic acid were mixed with the aged mixture and uniformly dispersed, thereby obtaining a composition of the present invention.

COMPARATIVE EXAMPLE 1

In the same way as in the Example 1 except for using 15 parts of Crystalite VX-SS (trade name: produced by Tatsumori Co., Ltd.) in place of the sodium acrylate polymer, a comparative composition was obtained.

COMPARATIVE EXAMPLE 2

In the same way as in the Example 2 except for using 20 parts of Celite Super Floss (trade name: produced by Johns Manville Co., Ltd.) in place of the acrylic acid-vinyl alcohol copolymer, a comparative composition was obtained.

Each composition obtained in Examples 1 to 3 and Comparative Examples 1 and 2 was poured into a mold and left for 24 hours at room temperature, thereby obtaining a 100×20×2 mm sheet of cured composition. The values of the physical properties of the cured composition were assumed to be the values at the initial state. In each case, an initial state specimen was subjected to an immersion test in which the composition was immersed in water for 24 hours at 25° C., and another initial state specimen was heated at 80° C. under the pressure of 10 mmHg for 2 hours to dry it. Thereafter a test of the physical properties was carried out. The results are shown in Table 1.

TABLE 1

|  | Examples | | | Comparative Examples | |
| --- | --- | --- | --- | --- | --- |
|  | 1 | 2 | 3 | 1 | 2 |
| Initial value Hardness (JIS A) | 30 | 46 | 46 | 29 | 50 |
| Tensile Strength (kgf/cm$^2$) | 10 | 36 | 37 | 13 | 37 |
| Elongation (%) | 130 | 260 | 260 | 130 | 250 |
| Change in Weight after water Immersion (%) | 850 | 920 | 920 | 0 | 0 |
| After Drying Hardness (JIS A) | 29 | 46 | 45 |  |  |
| Tensile Strength (kgf/cm$^2$) | 9 | 35 | 36 |  |  |
| Elongation (%) | 130 | 250 | 250 |  |  |

EXAMPLE 4

100 parts of polydimethylsiloxane base oil having both ends sealed by dimethylvinylsilyl groups and having a viscosity of 5,000 cSt at 25° C., 10 parts of Sumicagel F-03 (trade name: produced by Sumitomo Chemical Co. Ltd.) as an sodium acrylate-acryl amide copolymer, 2 parts of straight-chain polymethylhydrogensiloxane having both ends sealed by trimethylsilyl group, containing 0.8% by weight of silicon bonded hydrogen, and having the viscosity of 20 cSt at 25° C., and 15 ppm (in terms of platinum with respect to the base oil) of isopropyl alcohol solution of chloroplatinic acid were mixed and uniformly dispersed, thereby obtaining a composition of the present invention. The thus-obtained composition was poured into a mold and left for 24 hours at room temperature, thereby obtaining a 100×20×2 mm sheet of cured composition. When the cured composition was subjected to an immersion test in which the composition was immersed in water for 24 hours at 25° C., it displayed good water absorbing properties (change in weight after immersion was 750%).

EXAMPLE 5

To 100 parts of polydimethylsiloxane base oil having both ends sealed by silanol groups and having the viscosity of 3,000 cSt at 25° C. were added 40 parts of Sumicagel SP-520 (trade name: produced by Sumitomo Chemical Co. Ltd.) an acrylic acid-vinyl alcohol copolymer, and the mixture was heated and kneaded at 70° C. under 10 mmHg for 3 hours. To the mixture 2 parts of ethyl silicate and 0.5 part of dibutyl tin dilaurate were added and mixed, thereby obtaining a composition of the present invention.

The thus-obtained composition was poured into a mold and was left for 3 days at room temperature, thereby obtaining a 100×20×2 mm sheet of cured composition. The cured composition was subjected to a test on the physical properties at the initial state, an immersion test, and a test in the physical properties after drying in the same way as in Example 1. The results are shown in Table 2.

EXAMPLE 6

100 parts of polydimethylsiloxane base oil having both ends sealed by silanol groups and having a viscosity of 100,000 cSt at 25° C., 20 parts of Crystalite VX-SS (trade name: produced by Tatsumori Co., Ltd.) as a filler, and 20 parts of Sumicagel NP-1020 (trade name: produced by Sumitomo Chemical Co. Ltd.) as a sodium acrylate polymer were heated and kneaded at 80° C. under 10 mmHg for 50 hours. To the mixture 5 parts of methyl tris-(methyl ethyl ketoxime) silane and 0.2 part of dibutyl tin dioctoate were added and mixed, thereby obtaining a composition of the present invention.

The thus-obtained composition was cured in the same way as in Example 5, and the same tests on the cured composition as Example 1 were carried out. The results are shown in Table 2.

COMPARATIVE EXAMPLE 3

In the same way as in the Example 5 except for using 40 parts of Crystalite VX-S in place of Sumicagel SP-520, a sheet of cured composition was obtained.

The same tests on the cured composition as Example 1 were carried out. The results are shown in Table 2.

COMPARATIVE EXAMPLE 4

In the same way as in the Example 6 except for using 20 parts of Celite Super Floss (trade name: produced by Johns Manville Co., Ltd.) in place of the sodium acrylate polymer, a sheet of cured composition was obtained.

The same tests on the cured composition as Example 1 were carried out. The results are shown in Table 2.

TABLE 2

|  | Examples | | Comparative Examples | |
|---|---|---|---|---|
|  | 5 | 6 | 3 | 4 |
| Initial value Hardness (JIS A) | 42 | 45 | 41 | 49 |
| Tensile Strength (kgf/cm$^2$) | 26 | 39 | 27 | 40 |
| Elongation (%) | 150 | 200 | 130 | 180 |
| Change in Weight after water Immersion (%) | 1,200 | 800 | 0 | 0 |
| After Drying Hardness (JIS A) | 42 | 45 |  |  |
| Tensile Strength (kgf/cm$^2$) | 25 | 38 |  |  |
| Elongation (%) | 150 | 190 |  |  |

EXAMPLE 7

To 100 parts of polydimethylsiloxane base oil having both ends sealed by silanol groups and having a viscosity of 5,000 cSt at 25° C. were added 10 parts of Aquakeep 10SH (trade name: produced by Seitetsu Kagaku Co, Ltd.), a sodium acrylate polymer. The mixture was heated and kneaded at 80° C. under 10 mmHg for 3 hours. To the mixture 2 parts of n-propyl silicate and 0.2 part of dibutyl tin dilaurate were added and mixed, thereby obtaining a composition of the present invention.

The thus-obtained composition was cured in the same way as in Example 5, and the same water immersion test on the cured composition as Example 1 was carried out. The results are shown in Table 3.

EXAMPLE 8

To 100 parts of polydimethylsiloxane base oil having both ends sealed by silanol groups and having a viscosity of 5,000 cSt at 25° C. were added 10 parts of Aquakeep 10SH, as a sodium acrylate polymer. The mixture was heated and kneaded at 80° C. under 10 mmHg for 3 hours, and was thereafter aged at 50° C. for 60 days. To the aged mixture 2 parts of n-propyl silicate and 0.2 part of dibutyl tin dilaurate were added and mixed, thereby obtaining a composition of the present invention.

The thus-obtained composition was cured in the same way as in Example 5, and the same water immersion test on the cured composition as Example 1 was carried out. The results are shown in Table 3.

TABLE 3

|  | Examples | |
|---|---|---|
|  | 7 | 8 |
| Change in Weight after water Immersion (%) | 650 | 650 |

EXAMPLE 9

To 100 parts of polydimethylsiloxane base oil having both ends sealed by silanol groups and having a viscosity of 10,000 cSt at 250° C. were added and mixed 10 parts of Sumicagel F-03 (trade name: produced by Sumitomo Chemical Co. Ltd.) a sodium acrylate-acryl amide copolymer, 1.5 parts of ethyl silicate and 0.3 part of dibutyl tin diacetate thereby obtaining a composition of the present invention.

The thus-obtained composition was poured into a mold and was left for 30 days at room temperature, thereby obtaining a 100×20×2 mm sheet of cured composition. The thus-obtained cured composition was subjected to an immersion test in which the composition was immersed in water at 25° C. for 24 hours. As a result, the cured composition displayed good water absorbing properties.

What is claimed is:

1. A polyorganosiloxane composition comprising:
   (a) a silicone composition curable to a rubber containing polysiloxane which is liquid at room temperature as a base polymer, said silicone composition selected from the group consisting of an addition cure type composition and a condensation cure type composition; and
   (b) a polymer of monomer units comprising acrylic acid or an alkali metal salt of acrylic acid or an alkali meal salt of acrylic acid.

2. A composition according to claim 1, wherein said silicone composition of the component (A) is an addition cure type.

3. A composition according to claim 2, wherein said curable silicone rubber composition of the component (A) is characterized by the following components:
   (C) 100 parts by weight of polyorganosiloxane having at least two units in a molecule represented by the following formula:

wherein $R^1$ represents an alkenyl group, $R^2$ a substituted or unsubstituted monovalent hydrocarbon group which contains no aliphatic unsaturated bond, a an integer of 1 or 2, b is an integer between 0 and 2 inclusive, and a+b is an integer between 1 and 3 inclusive;
   (D) polyorganohydrogensiloxane in quantities in which the number of hydrogen atoms which are combined with a silicon atom is 0.5 to 4.0 per $R^1$ group in polyorganosiloxane (C), and the molecules on average comprising at least three units represented by the formula:

wherein $R^3$ represents a substituted or unsubstituted monovalent hydrocarbon group, c is an integer between 0 and 2 inclusive, d is an integer of 1 or 2, and c+d is an integer between 1 and 3 inclusive; and
   (E) 1 to 100 ppm of platinum or platinum compound catalyst, as platinum with respect to polyorganosiloxane (C).

4. A composition according to claim 3, wherein said polymer containing acrylic acid or an alkali metal salt of acrylic acid as a monomer unit of the component (B) is added in an amount of 0.5 to 200 parts by weight per 100 parts by weight of said polyorganosiloxane of component (C).

5. A composition according to claim 4, wherein said $R^1$ in the component (C) is a vinyl group.

6. A composition according to claim 4, wherein said polyorganosiloxane of the component (D) is represented by the following formula:

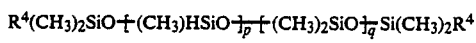

wherein R4 represents a hydrogen atom or a methyl group, p is an integer between 1 and 100 inclusive and between 3 and 100 inclusive when said two $R^4$s are methyl groups, and q is an integer-between 0 and 100.

7. A composition according to claim 4, wherein said polyorganosiloxane of component (D) comprises $(CH_3)_2HSiO_{\frac{1}{2}}$ units and $SiO_2$ units, and the content of hydrogen atoms which are combined with a silicon atom is 0.3 to 1.2% by weight of the molecular weight.

8. A composition according to claim 4, wherein the component (B) is an acrylic acid-vinyl alcohol copolymer, a sodium acrylate polymer or a sodium acrylate-acrylamide copolymer.

9. A composition according to claim 1, wherein said silicone composition is of a condensation cure type.

10. A composition according to claim 9, wherein said curable silicone rubber composition is characterized by the following components:
(F) 100 parts by weight of silanol end blocked polyorganosiloxane having a viscosity of 500 to 500,000 cSt at 25° C.; and
(G) a curing agent comprising an organic silicone compound having at least three silicon bonded hydrolyzable groups per molecule.

11. A composition according to claim 10, wherein said polymer containing acrylic acid or an alkali metal salt of acrylic acid as a monomer unit of component (B) is added in an amount of 0.5 to 200 parts by weight per 100 parts by weight of said polyorganosiloxane of component (F).

12. A composition according to claim 11, wherein component (B) is an acrylic acid-vinyl alcohol copolymer, a sodium acrylate polymer or a sodium acrylate-acrylamide copolymer.

* * * * *